(12) United States Patent
Song et al.

(10) Patent No.: US 9,041,539 B2
(45) Date of Patent: May 26, 2015

(54) RFID TAG AND METHOD FOR RECEIVING SIGNAL THEREOF

(75) Inventors: Iljong Song, Yongin-si (KR); CholSu Yoon, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 910 days.

(21) Appl. No.: 13/157,692

(22) Filed: Jun. 10, 2011

(65) Prior Publication Data

US 2011/0304461 A1    Dec. 15, 2011

(51) Int. Cl.
- *G08B 13/14* (2006.01)
- *H04B 1/26* (2006.01)
- *G06K 19/07* (2006.01)

(52) U.S. Cl.
CPC ........ *G06K 19/0723* (2013.01); *G06K 19/0715* (2013.01)

(58) Field of Classification Search
USPC ............. 340/572.1, 572.4–572.5, 572.7; 341/176; 323/274; 455/338, 341, 455/114.3, 91, 127.1, 323, 334
See application file for complete search history.

(56) References Cited

U.S. PATENT DOCUMENTS

| | | | |
|---|---|---|---|
| 4,345,167 A * | 8/1982 | Calvin | 327/517 |
| 4,958,123 A * | 9/1990 | Hughes | 323/316 |
| 5,237,493 A * | 8/1993 | Durig et al. | 363/73 |
| 8,127,603 B2 * | 3/2012 | Nagata | 73/290 R |
| 2006/0135093 A1 * | 6/2006 | Ito et al. | 455/126 |
| 2008/0100491 A1 * | 5/2008 | Umeda et al. | 341/176 |
| 2008/0101802 A1 * | 5/2008 | Yano | 398/202 |
| 2008/0280585 A1 * | 11/2008 | Chen et al. | 455/338 |
| 2009/0195227 A1 * | 8/2009 | Morino | 323/224 |
| 2010/0102878 A1 * | 4/2010 | Nagata | 330/86 |

FOREIGN PATENT DOCUMENTS

| | | |
|---|---|---|
| JP | 11168417 A | 6/1999 |
| JP | 2003208583 A | 7/2003 |
| KR | 100720227 B1 | 5/2007 |
| KR | 20070052533 A | 5/2007 |

* cited by examiner

*Primary Examiner* — Hoi Lau (74) *Attorney, Agent, or Firm* — Harness, Dickey & Pierce, P.L.C.

(57) ABSTRACT

Provided are a radio frequency identification (RFID) tag and a method for receiving a signal of the RFID tag. The RFID tag includes a voltage generator configured to generate a voltage signal from a received signal, a common gate circuit configured to convert the voltage signal into a current signal, a current/voltage converter configured to the current signal into a voltage signal by using a resistance value, a low-pass filter configured to perform low-pass filtering on the converted voltage signal, a buffer configured to buffer the low-pass-filtered voltage signal within an operation range, and a peak detector configured to detect a peak value from the buffered signal to demodulate information data. The current/voltage converter controls the resistance value to convert the current signal into a voltage signal included within the operation range of the buffer.

11 Claims, 6 Drawing Sheets

RFID TAG AND METHOD FOR RECEIVING SIGNAL THEREOF

CROSS-REFERENCE TO RELATED APPLICATIONS

This U.S. non-provisional patent application claims priority under 35 U.S.C. §119 to Korean Patent Application No. 10-2010-0054565, filed on Jun. 10, 2010, the entire contents of which is hereby incorporated by reference.

BACKGROUND

1. Technical Field

Example embodiments relate to RFID tags and, for example, to an RFID tag with improved signal reception performance and a method for receiving a signal of the RFID tag.

2. Description of the Related Art

Radio frequency identification (hereinafter referred to as "RFID") technology is an information recognition technology that uses radio waves to send and receive information. An example system employing RFID technology includes an RFID reader and an RFID tag.

The RFID reader is connected to an information processing device, e.g., a computer, to process data collected from the RFID tag. The RFID tag writes data therein or reads data encapsulated in a control signal received from the RFID reader before transmitting the written or read data to the RFID reader.

Because the RFID tag communicates with the RFID reader in a contactless manner, a signal with an amplitude normally encountered in this technology may not be received at the RFID tag using conventional methods because of distance or obstacles between the RFID tag and the RFID reader. As the RFID tag receives signals of irregular amplitudes, signal reception performance of the RFID tag may be further deteriorated when using conventional systems.

SUMMARY

Example embodiments of inventive concepts provide a radio frequency identification (RFID) tag.

According to example embodiments of inventive concepts, the RFID tag may include a voltage generator configured to generate a voltage signal from a reception signal; a common gate circuit configured to convert the voltage signal into a current signal; a current/voltage converter configured to convert the current signal into a converted voltage signal by controlling a resistance value; and a buffer configured to buffer a low-pass-filtered voltage signal within an operation range. The current/voltage converter may control the resistance value to convert the current signal into the converted voltage signal included within the operation range of the buffer.

In example embodiments, the current/voltage converter may include a transistor operating in response to the current signal, the transistor including a source and gate connected to each other and a drain connected to a ground terminal; and a resistor connected in parallel to the transistor.

In example embodiments, the transistor may control the resistance value to decrease through a turn-on operation when an amplitude of the current signal is greater than an amplitude of a reference current signal and may control the resistance value to be maintained through a turn-off operation when the amplitude of the current signal is greater than the amplitude of the reference current signal.

In example embodiments, the RFID tag may further include a control circuit configured to generate a control signal for controlling the resistance value based on the amplitude of a voltage signal obtained from the reception signal.

In example embodiments, the current/voltage converter may include a variable resistor having a resistance value varying in response to the control signal; and a resistor connected in series to the variable resistor and connected to a ground terminal.

In example embodiments, the control circuit may generate a control signal controlling the resistance value to decrease through the control of the variable resistor when the amplitude of the voltage signal is greater than an amplitude of a reference voltage signal and the control circuit generates the control signal controlling the resistance value to increase through the control of the variable resistor when the amplitude of the voltage signal is smaller than the amplitude of the reference voltage signal.

In example embodiments, the current/voltage converter may include a transistor configured to perform a switching operation in response to the control signal; and a resistor connected in series to the transistor and connected to a ground terminal.

In example embodiments, the control signal may control the resistance value to decrease through a turn-on operation of the transistor when the amplitude of the voltage signal is greater than the amplitude of a reference voltage signal and the control signal may control the resistance value to increase through a turn-off operation of the transistor when the amplitude of the voltage signal is smaller than the amplitude of the reference voltage signal.

According to example embodiments of inventive concepts, the RFID tag may include a demodulator configured to demodulate reception data from a reception signal; a digital signal processor configured to digitally process the reception data; and a memory configured to store the digitally processed reception data. The demodulator may include a voltage generator configured to generate a voltage signal; a common gate circuit configured to convert the voltage signal into a current signal; a current/voltage converter configured to convert the current signal into a converted voltage signal by using a resistance value; a low-pass filter configured to perform low-pass filtering on the converted voltage signal; a buffer configured to buffer the low-pass-filtered voltage signal within an operation range; and a peak detector configured to detect a peak value from the buffered signal to demodulate information data. The current/voltage converter may control the resistance value to convert the current signal into the converted voltage signal included within the operation range of the buffer.

In example embodiments, the current/voltage converter may include a transistor whose source and gate are connected to each other and drain is connected to a ground terminal, the transistor operating in response to the current signal; and a resistor connected in parallel to the transistor. The transistor may be configured to control the resistance value through a turn-on operation to decrease the resistance value when the amplitude of the current signal is greater than the amplitude of a reference current signal and may be configured to control the resistance value through a turn-off operation to increase the resistance value when the amplitude of the current signal is smaller than the amplitude of the reference current signal.

In example embodiments, the RFID tag may further include a control circuit configured to generate a control signal for controlling the resistance value based on the amplitude of the voltage signal obtained from the reception signal, the control signal configured to decrease the resistance value when the amplitude of the voltage signal is greater than the amplitude of a reference voltage signal and to increase the resistance value when the amplitude of the voltage signal is smaller than the amplitude of the reference voltage signal.

Example embodiments of inventive concepts provide a method for receiving a signal of a radio frequency identification (RFID) tag.

According to example embodiments, the method may include generating a voltage signal from a reception signal; converting the voltage signal into a current signal; converting the current signal into a converted voltage signal by controlling a resistance value to be included within an operation range of a buffer; performing low-pass filtering for the converted voltage signal; buffering the converted voltage signal within the operation range of the buffer; and detecting a peak value of the buffered signal to modulate information data.

In example embodiments, converting the current signal into a voltage signal may include controlling the resistance value to decrease when the amplitude of the current signal is greater than the amplitude of a reference current signal, and converting the current signal into the converted voltage signal by controlling the resistance value to increase when the amplitude of the current signal is smaller than the amplitude of the reference current signal.

In example embodiments, converting the current signal into a converted voltage signal may include detecting a voltage signal generated from the reception signal; generating a control signal to decrease the resistance value when the amplitude of the detected voltage signal is greater than the amplitude of a reference voltage signal and generating the control signal to increase the resistance value when the amplitude of the detected voltage signal is smaller than the amplitude of the reference voltage signal; and converting the current signal into the converted voltage signal in response to the control signal.

Example embodiments of inventive concepts provide a current/voltage converter configured to generate a voltage signal with a constant amplitude.

According to example embodiments of inventive concepts, a current/voltage converter may include a resistance element configured to receive a current signal. The resistance element may further include a variable resistance component and a constant resistance component coupled to the variable resistance component. The voltage signal may be a voltage drop across the resistance element.

In example embodiments, the variable resistance component may be a transistor.

In example embodiments, the variable resistance component may be a variable resistor.

In example embodiments, the variable resistance component may be configured to receive a control signal to modify the resistance value of the variable resistance component.

In example embodiments, the variable resistance value may increase when the amplitude of the current signal is less than the amplitude of a reference current signal. The variable resistance value may decrease when the amplitude of the current signal is greater than the amplitude of the reference current signal.

In example embodiments, the transistor may be configured to receive a control signal to modify the resistance value of the transistor. The constant resistance component may be coupled in series with the transistor.

In example embodiments, the control signal may control the transistor to turn off and increase the variable resistance value when an amplitude of an input voltage is lower than an amplitude of a reference voltage. The control signal may control the transistor to turn on and decrease the variable resistance value when the amplitude of the input voltage is greater than the amplitude of the reference voltage.

In example embodiments, the transistor may be coupled in parallel with the constant resistance component.

In example embodiments, the transistor may be configured to receive the current signal at the source of the transistor. The transistor may control the transistor resistance value by adjusting the transistor resistance value down through a turn-on function when the amplitude of the current signal is greater than the amplitude of a reference current signal. The transistor may control the transistor resistance value by adjusting the transistor resistance value up through a turn-off function when the amplitude of the current signal is smaller than the amplitude of the reference current signal.

In example embodiments, the variable resistance component may be a variable resistor and the variable resistor may be coupled in series to the constant resistance element.

In example embodiments, the control signal may control the variable resistor to increase the variable resistance value when an amplitude of an input voltage is lower than an amplitude of a reference voltage. The control signal may control the variable resistor to decrease the variable resistance value when the amplitude of the input voltage is greater than the amplitude of the reference voltage.

According to example embodiments of inventive concepts, a current/voltage converter may be configured to generate a voltage signal with a constant amplitude for use with an RFID tag.

In example embodiments, a resistance element may be configured to receive a current. The resistance element may include a variable resistance component and a constant resistance component coupled to the variable resistance component. The voltage signal may be a voltage drop across the resistance element.

In example embodiments, the variable resistance value may increase when the amplitude of the current signal is less than the amplitude of a reference current signal. The variable resistance value may decrease when the amplitude of the current signal is greater than the amplitude of the reference current signal.

In example embodiments, a control circuit may control the variable resistance value to increase when the amplitude of an input voltage signal is less than the amplitude of a reference voltage signal. The control circuit may control the variable resistance value to decrease when the amplitude of the input voltage signal is greater than the amplitude of the reference voltage signal.

In example embodiments, the variable resistance component may be a transistor. The transistor may control the variable resistance value of the transistor through a turn-on operation to decrease the variable resistance value of the transistor when the amplitude of the input voltage signal is greater than the amplitude of the reference voltage signal. The transistor may control the variable resistance value of the transistor through a turn-off operation to increase the variable resistance value of the transistor when the amplitude of the input voltage signal is greater than the amplitude of the reference voltage signal.

In example embodiments, the variable resistance component may be a variable resistor. The variable resistor may be coupled in series to the constant resistance component.

In example embodiments, the variable resistance may be a transistor. The transistor may be coupled in parallel to the constant resistance component.

In example embodiments, the transistor may control the variable resistance value of the transistor through a turn-on value to decrease the variable resistance value of the transistor when the amplitude of an input current signal is greater than the amplitude of the reference current signal. The transistor may increase the variable resistance value of the transistor through a turn-off operation when the amplitude of the input current signal is less than the amplitude of the reference current signal.

In example embodiments, the current/voltage converter may include a low-pass filter configured to perform low-pass filtering on the converted voltage signal.

In example embodiments, the RFID tag may include a peak detector configured to detect a peak value from the buffered signal to demodulate information data.

BRIEF DESCRIPTION OF THE DRAWINGS

Example embodiments of inventive concepts will be more clearly understood from the following brief description taken in conjunction with the accompanying drawings. FIGS. 1-7 represent non-limiting, example embodiments as described herein.

DETAILED DESCRIPTION OF EXAMPLE EMBODIMENTS

Example embodiments of inventive concepts will now be described more fully hereinafter with reference to the accompanying drawings, in which example embodiments of inventive concepts are shown. However, inventive concepts may be embodied in many different forms and should not be construed as limited to example embodiments set forth herein. Rather, example embodiments are provided so that this disclosure will be thorough and complete, and will frilly convey the scope of inventive concepts to those skilled in the art. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary Wan. "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Example embodiments according to the present invention will now be described with reference to FIG. 1. In example embodiments, the RFID system may include an RFID reader 10 and an RFID tag 20.

The RFID reader 10 transmits and receives information to and from the RFID tag 20. The RFID reader 10 transmits a constant-frequency signal to the RFID tag 20.

The RFID tag 20 may be activated by receiving power, e.g., a voltage through the reception of the constant-frequency signal from the RFID reader 10. An RFID tag 20 operating by receiving power from the RFID reader 10 is called "a passive RFID tag", while an RFID tag 20 including power for self-operation is called "an active RFID tag". Inventive concepts will be described with respect to a passive RFID tag 20 that receives power from the RFID reader 10, but are equally applicable to active RFID tags.

The activated RFID tag 20 receives power to process a radio frequency (RF) signal when a command signal is received from the RFID reader 10.

Figure 1:
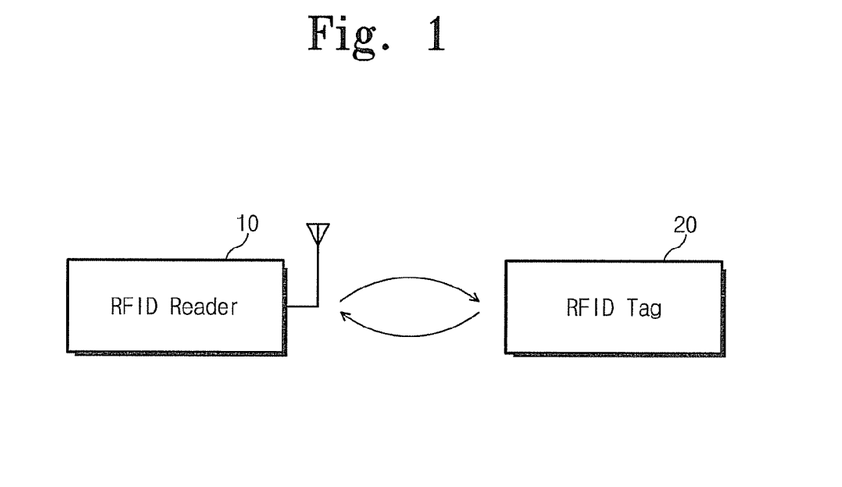
FIG. 1 illustrates an example of an RFID system according to example embodiments of inventive concepts.
Figure 2:
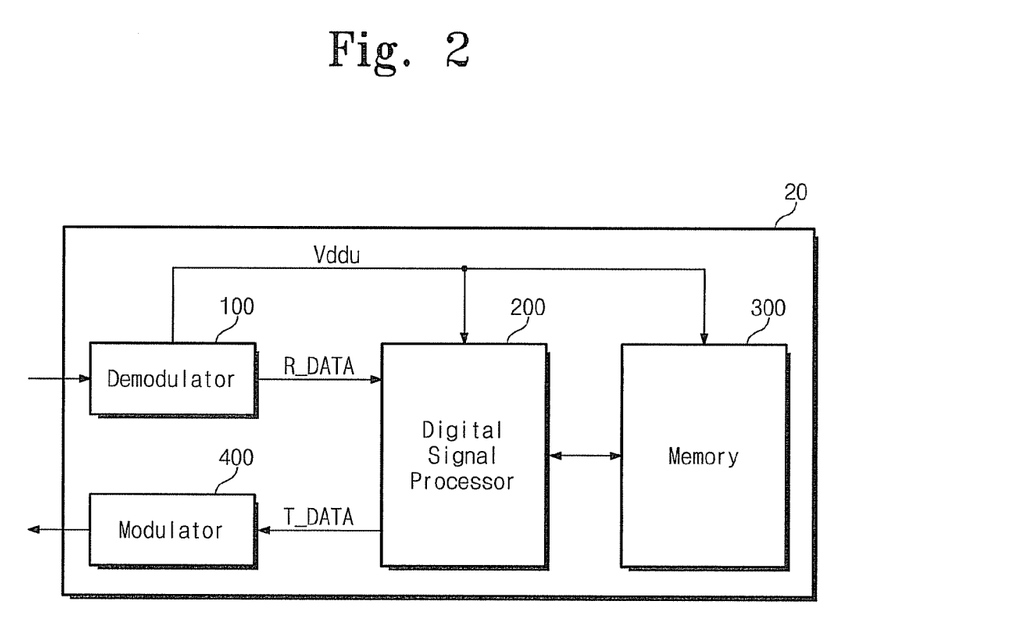
FIG. 2 illustrates an example structure of the RFID tag shown in FIG. 1.

FIG. 2 shows a structure of the RFID tag 20 shown in FIG. 1. As shown, the RFID tag 20 may include a demodulator 100, a digital signal processor 200, a memory 300, and/or a modulator 400.

The demodulator 100 receives a signal and generates a voltage signal Vddu from the received signal. The voltage signal Vddu may be used as a power supply voltage for operation in the digital signal processor 200 and the memory 300. The demodulator 100 demodulates a received signal to provide received data R_DATA to the digital signal processor 200.

The digital signal processor 200 may include a reference clock generator (not shown), a central processing unit (not shown), and so forth. The digital signal processor 200 performs digital signal processing for the received data R_DATA and generates transmission data T_DATA through digital signal processing. The digital signal processor 200 may store or read transmitted/received data.

The memory 300 stores data as requested by the digital signal processor 200.

The modulator 400 receives transmission data generated by the digital signal processor 200. The modulator 400 modulates transmission data before transmitting the modulated transmission data.

Inventive concepts propose a structure of a demodulator 100 for demodulating a signal wherein variations in the amplitude of a received signal may have a reduced influence on the demodulator compared to the conventional art. Example structures of the demodulator 100 will be described below in detail with reference to FIGS. 3, 5, and 6.

Figure 3:
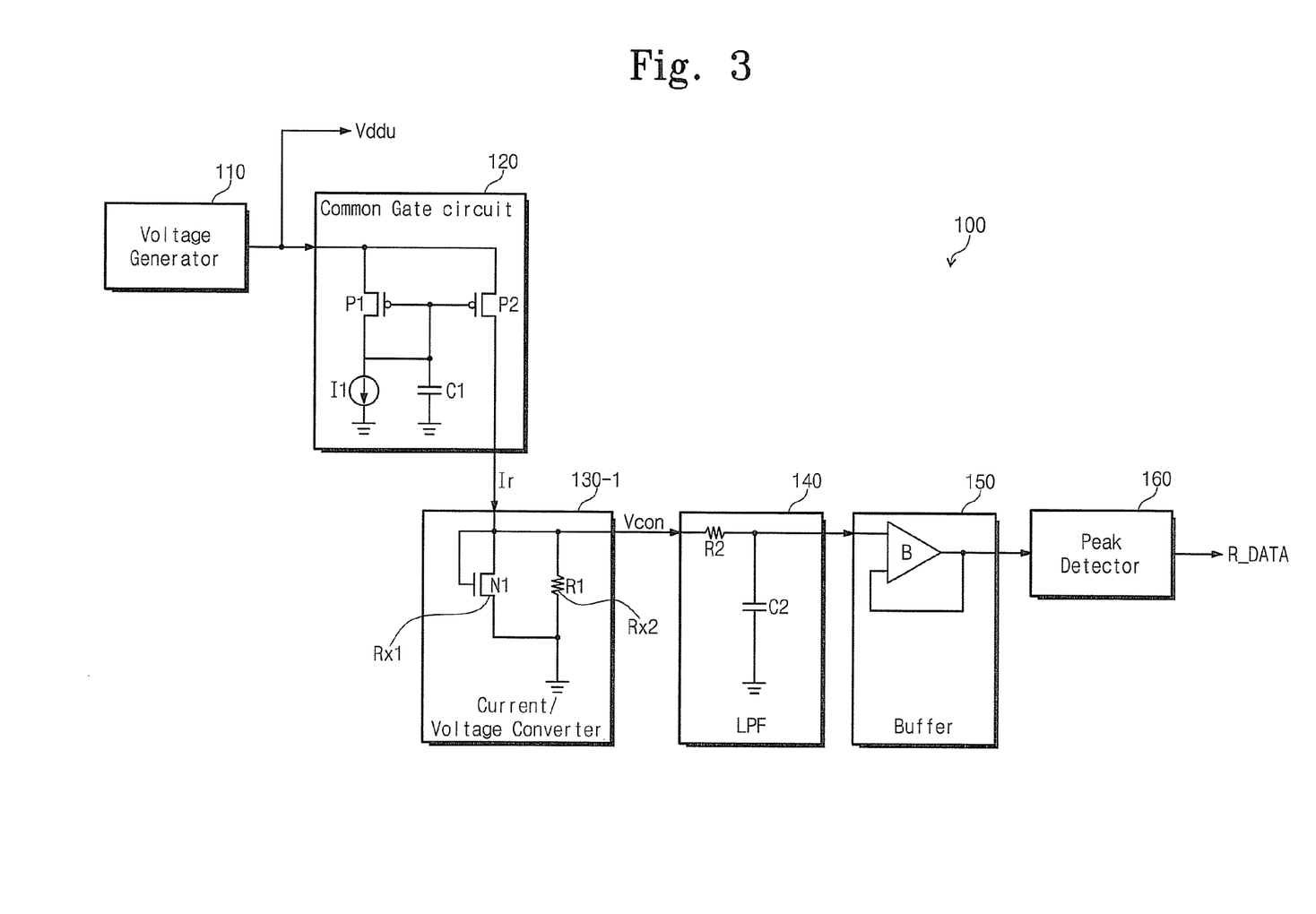
FIG. 3 illustrates a structure of a demodulator according to example embodiments of inventive concepts.

FIG. 3 shows a structure of the demodulator 100 according to example embodiments of inventive concepts. As shown, the demodulator 100 may include a voltage generator 110, a common gate circuit 120, a current/voltage converter 130-1, a low-pass filter (LPF) 140, a buffer 150, and/or a peak detector 160.

The voltage generator 110 generates a voltage signal Vddu from a received signal.

The voltage signal Vddu may be used to demodulate data. The voltage signal Vddu may also be used as an operating voltage of the respective modules (for example, the digital signal processor 200 and the memory 300) in the RFID tag 20. The voltage signal Vddu generated by the voltage generator 110 may be output to the common gate circuit 120.

A source of a first PMOS transistor P1 may be connected to the voltage signal Vddu. A drain of the first PMOS transistor P1 may be connected to a gate of the first PMOS transistor P1. A gate of the first PMOS transistor P1 may be interconnected to a gate of a PMOS transistor P2.

A first current source I1 may be connected to the drain and a ground terminal of the first PMOS transistor P1.

A first capacitor C1 may be coupled between a ground terminal and a gate contact point between the PMOS transistors P1 and P2.

A source of the second PMOS transistor P2 may be connected to the voltage signal Vddu. The second PMOS transistor P2 functions as a common gate amplifier. Thus, a drain of the second PMOS transistor P2 generates a current signal based on the voltage signal Vddu. The second PMOS transistor P2 outputs the generated current signal Ir to the current/voltage converter 130-1.

The current/voltage converter 130-1 converts the current signal Ir into a voltage signal Vcon.

An first NMOS transistor N1 may be disposed at the front end of a first resistor R1. The first resistor R1 has a resistance value Rx2 according to characteristics of a device. A source and a gate of the first NMOS transistor N1 may be interconnected. A drain of the first NMOS transistor N1 may have a resistance value Rx1 that is variable with the current signal Ir.

The first resistor R1 may be connected in parallel to the first NMOS transistor N1. The first resistor R1 has a resistance value Rx2 according to characteristics of a device. The first resistor R1 outputs the converted voltage signal Vcon to the low-pass filter 140. The voltage signal Vcon may be a signal converted by the whole resistance value Req (generated by a resistance value Rx1 and a resistance value Rx2) from the current signal Ir. The voltage signal Vcon may be a signal included within an operational range of a buffer 150.

The low-pass filter 140 removes high frequency elements included in the voltage signal Vcon and passes low frequency elements to buffer 150.

The low-pass filter 140 may include a second resistor R2 and a second capacitor C2 for low-pass filtering.

The second resistor R2 receives the voltage signal Vcon.

The second capacitor C2 may be connected in parallel to the second resistor R2. The second capacitor C2 may be connected to a ground terminal.

The second resistor R2 and the second capacitor C2 perform low-pass filtering to pass only low frequency elements included in the voltage signal Vcon.

The buffer 150 buffers the low-pass-filtered voltage signal Vcon within an operation range of a buffer, e.g., a common mode range.

The buffer 150 may include a buffer B operational amplifier configured to buffer a voltage signal Vcon within an operation range.

The peak detector 160 detects a peak value of the voltage signal Vcon output from a buffer.

The peak detector 160 detects, for example, received data R_DATA formed by a peak value (rising edge or falling edge).

Typically, the buffer 150 included in the demodulator 100 is capable of buffering only a voltage signal within an operation range. However, a voltage signal that is not within the operation range may be input to the buffer 150 according to the amplitude of a received signal.

The current/voltage converter 130-1 according to inventive concepts may include a first NMOS transistor N1 that may be turned on or turned off according to the amplitude of a current signal Ir. The current/voltage converter 130-1 may include a first resistor R1 connected in parallel to the first NMOS transistor N1.

The first NMOS transistor N1 has a resistance value Rx1 varying with a turn-on or turn-off operation. The first resistor R1 has a resistance value Rx2. Thus, in the current/voltage converter 130-1, the whole resistance value Req for generating a voltage signal Vcon may have a value obtained by parallel combination of a resistance value Rx1 and a resistance value Rx2 (as an example, (Rx1*Rx2)/(Rx1+Rx2)).

In the current/voltage converter 130-1 according to inventive concepts, the first NMOS transistor N1 may be turned on (the resistance value Rx1 decreases) when the amplitude of the current signal Ir is greater than that of a reference current and may be turned off (the resistance value Rx1 increases) when the amplitude of the current signal Ir is smaller than the amplitude of the reference current. That is, the resistance value Req varies with the amplitude of the current signal Ir.

Accordingly, the current/voltage converter 130-1 may generate the voltage signal Vcon included within the operation range of the buffer 150. The current signal Ir may be a signal varying with the amplitude of a received signal. For this reason, the current/voltage converter 130-1 may generate a power signal Vcon included in the operation range of the buffer 150 irrespective of the amplitude of a received signal.

That is, reception performance need not be deteriorated because the buffer 150 may receive the power signal Vcon included within an operational range.

The operation of the first NMOS transistor N1 according to the variation of the current signal Ir will now be described below with reference to FIG. 4.

Figure 4:
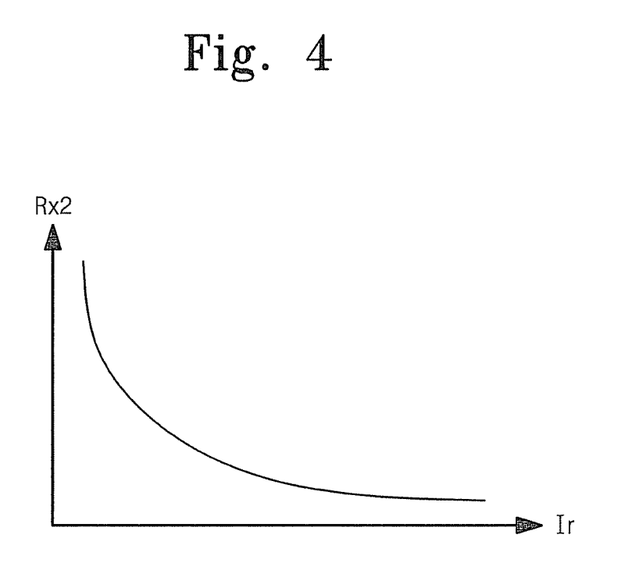
FIG. 4 illustrates an operation graph of an example NMOS transistor included in a current/voltage converter shown in FIG. 3.

FIG. 4 shows an operation graph of the first NMOS transistor N1 included in the current/voltage converter 130-1 shown in FIG. 3. In FIG. 4, a horizontal axis represents a current signal Ir and a vertical axis represents a resistance value Rx1 of the first NMOS transistor N1.

As the size of a current signal increases, the resistance value Rx1 decreases due to a turn-on operation of an NMOS transistor. As the size of a current signal decreases, the resistance value Rx1 increases due to a turn-off operation of the NMOS transistor.

The foregoing variation of the resistance value Rx1 of the NMOS transistor allows the whole resistance value Req of the current/voltage converter 130-1 to have a form that may be similar to an operation graph of the first NMOS transistor N1.

In addition, the voltage signal Vcon, the current signal Ir, and the resistance Req have a relationship of Vcon=Ir*Req. Therefore, because the resistance value Req varies with the variation in size of the current signal Ir during generation of a voltage signal, the voltage signal Vcon input to a buffer may have a constant value irrespective of the size of a received signal.

Example embodiments according to the present invention will now be described with reference to FIG. 5. In example embodiments, the demodulator 100 may include a voltage generator 110, a common gate circuit 120, a current/voltage converter 130-2, a low-pass filter 140 (LPF) 160, and a control circuit 170.

Figure 5:
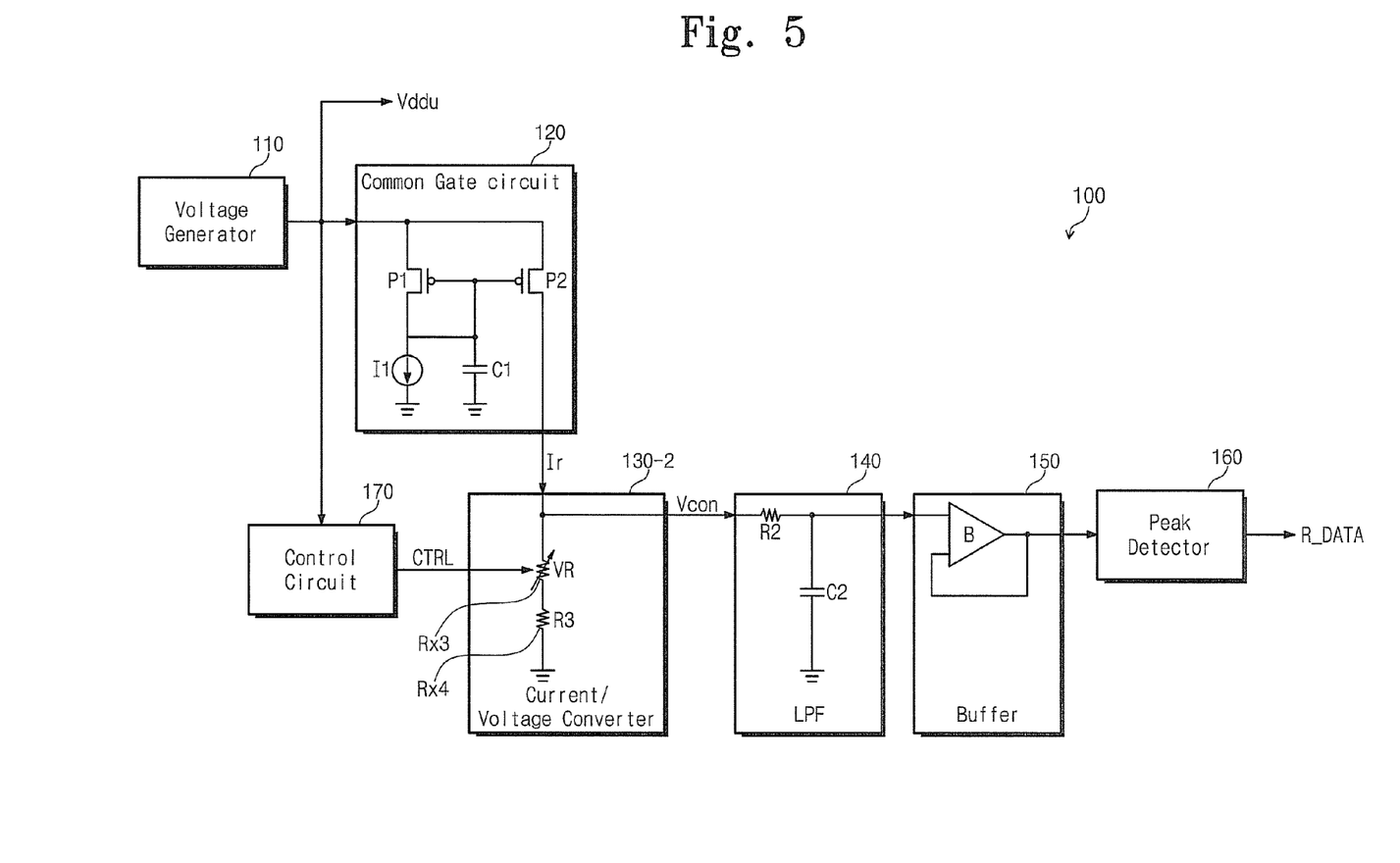
FIG. 5 illustrates a structure of a demodulator according to example embodiments of inventive concepts.

A general structure of the demodulator 100 shown in FIG. 5 may be similar to that of the demodulator 100 shown in FIG. 3. However, a structure of the current/voltage converter 130-2 shown in FIG. 5 may be different from that of the current/voltage converter 130-1 shown in FIG. 3. As compared to the demodulator 100 shown in FIG. 3, the demodulator 100 shown in FIG. 5 further may include a control circuit 170.

In view of the above, structures of the voltage generator 110, the common gate circuit 120, the low-pass filter 140, the buffer 150, and the peak detector 160 will not be described in further detail.

The current/voltage converter 130-2 converts a current signal Ir into a voltage signal Vcon. The current/voltage converter 130-2 may include a variable resistor VR and a third resistor R3.

The variable resistor VR may be connected in series to the third resistor R3. The variable resistor VR has a resistance value Rx3 varying in response to a control signal CTRL.

The third resistor R3 may be coupled between the variable resistor VR and a ground terminal. The third resistor R3 has a resistance value Rx4.

The current/voltage converter 130-2 converts the current signal Ir into the voltage signal Vcon by the whole resistance value Req generated by a resistance value Rx3 and resistance value Rx4.

The control circuit 170 receives a voltage signal Vddu of the voltage generator 110. The control circuit 170 generates the control signal CTRL for controlling the resistance value Rx3 of the variable resistor VR.

The detailed operation of the control circuit 170 is omitted herein and will be described later with reference to FIG. 7.

The current/voltage converter 130-2 has a resistance value varying with the control signal CTRL generated according to the size of the voltage signal Vddu. The voltage signal Vddu may be a signal obtained from a received signal. The current/voltage converter 130-2 may include a variable resistor VR having a resistance value Rx3 varying in response to the control signal CTRL. Additionally, the current/voltage converter 130-2 may include a third resistor R3 connected in series to the variable resistor VR.

The variable resistor VR receives a control signal CTRL controlling the resistance value Rx3 to decrease when the size of the voltage signal Vddu is great and receives a control signal CTRL controlling the resistance value Rx3 to increase when the size of the voltage signal Vddu is small.

Thus, in the current/voltage converter 130-2, the whole resistance value Req for generating a voltage signal Vcon may have the sum of the resistance Rx3 and the resistance value Rx4 (e.g., Rx3+Rx4).

Therefore, the current/voltage converter 130-2 may generate a power signal Vcon included within an operation range of the buffer 150 irrespective of the size of a received signal.

Because the buffer 150 may receive the power signal Vcon included within an operational range, reception performance need not be deteriorated.

Figure 6:
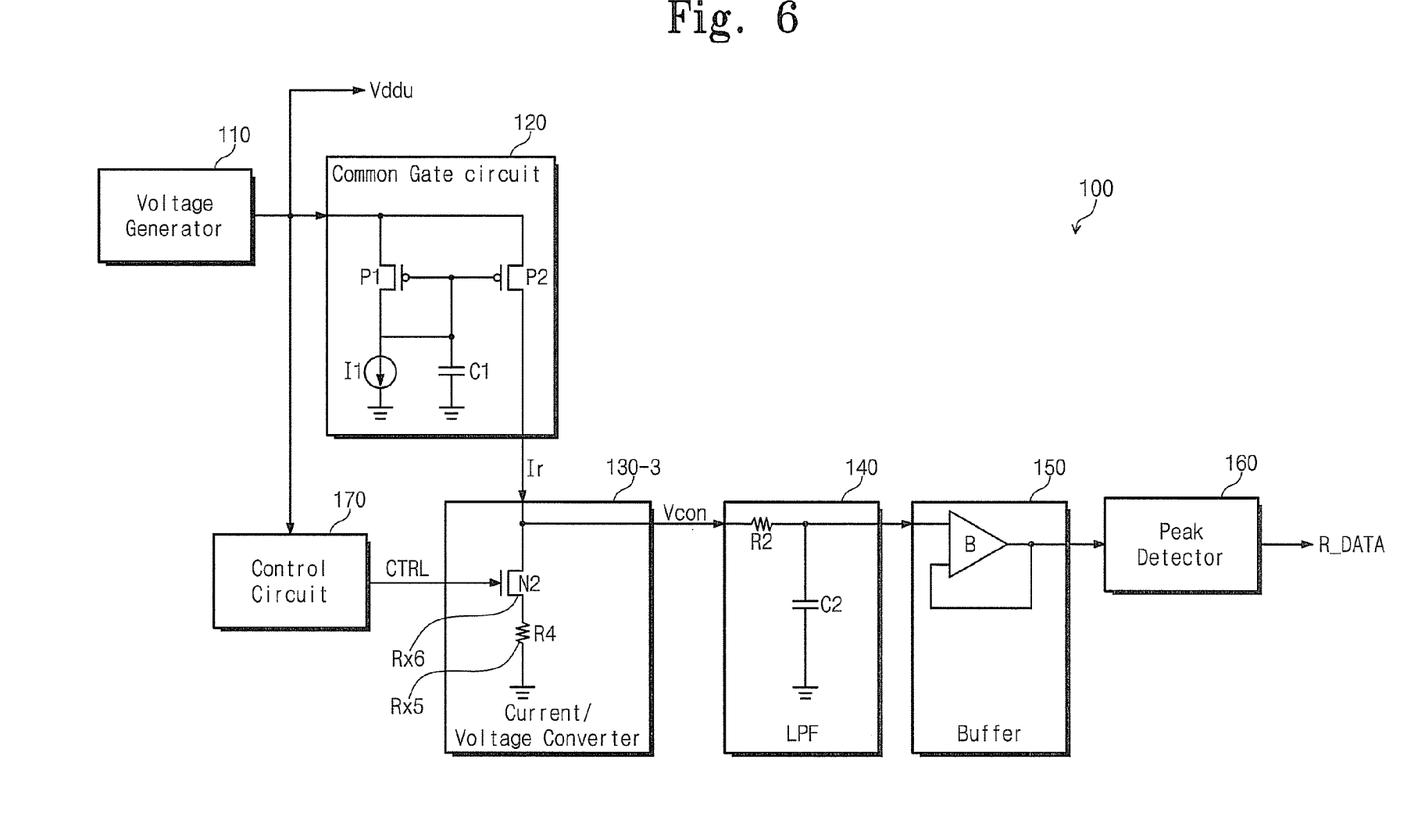
FIG. 6 illustrates a structure of a demodulator according to example embodiments of inventive concepts.

FIG. 6 shows a structure of a demodulator 100 according to example embodiments of inventive concepts. As shown, the demodulator 100 may include a voltage generator 110, a common gate circuit 120, a current/voltage converter 130-3, a low-pass filter (LPF) 140, a buffer 150, a peak detector 160, and a control circuit 170.

A general structure of the demodulator 100 shown in FIG. 6 may be similar to that of the demodulator 100 shown in FIG. 3. However, a structure of the current/voltage converter 130-3 shown in FIG. 5 may be different from that of the current/voltage converter 130-1 shown in FIG. 3. As compared to the demodulator 100 shown in FIG. 3, the demodulator 100 shown in FIG. 5 further may include a control circuit 170.

In view of the above, structures of the voltage generator 110, the common gate circuit 120, the low-pass filter 140, the buffer 150, and the peak detector 160 will not be described in further detail.

The current/voltage converter 130-3 converts a current signal Ir into a voltage signal Vcon. The current/voltage converter 130-3 may include a second NMOS transistor N2 and a fourth resistor R4.

The second NMOS transistor N2 may be connected in series to a third resistor R4. The second NMOS transistor N2 performs a turn-on (or switching-on) operation or a turn-off (switching-off) operation in response to a control signal CTRL. The NMOS has a resistance value Rx6.

The fourth resistor R4 may be connected to a ground terminal. The resistor R4 has a resistance value Rx5.

The current/voltage converter 130-3 converts the current signal Ir into the voltage signal Vcon by the whole resistance value Req generated by a resistance value Rx5 and Rx6. The whole resistance Req may be expressed by the sum of the resistance values Rx5 and Rx6.

The control circuit 170 receives a voltage signal Vddu of the voltage generator 110. The control circuit 170 generates the control signal CTRL for controlling the turn-off or turn-on operation of the NMOS transistor N2.

The detailed operation of the control circuit 170 is omitted herein and will be described later with reference to FIG. 7.

The current/voltage converter 130-3 has a resistance value Rx varying with the control signal CTRL generated according to the size of the voltage signal Vddu. The voltage signal Vddu may be a signal obtained from a received signal. The current/voltage converter 130-3 may include a NMOS transistor N2 performing a turn-on (switching-on) operation or a turn-off (switching-off) operation in response to the control signal CTRL. Additionally, the current/voltage converter 130-3 may include a resistor R4 connected in series to the NMOS transistor N2.

The second NMOS transistor N2 receives a control signal CTRL controlling the NMOS transistor N2 to perform a turn-on operation when the size of the voltage signal Vddu is great and receives a control signal CTRL controlling the second NMOS transistor N2 to perform a turn-off operation when the size of the voltage signal Vddu is relatively small.

Thus, in the current/voltage converter 130-3, the whole resistance value Req for generating a voltage signal Vcon may have a resistance value Rx5 during the turn-off operation and may not have a resistance value during the turn-on operation.

Therefore, the current/voltage converter 130-3 may generate a power signal Vcon included within an operational range of the buffer 150 irrespective of the size of a received signal.

Because the buffer 150 may receive the power signal Vcon included within an operational range, performance of the received signal need not be deteriorated.

Figure 7:
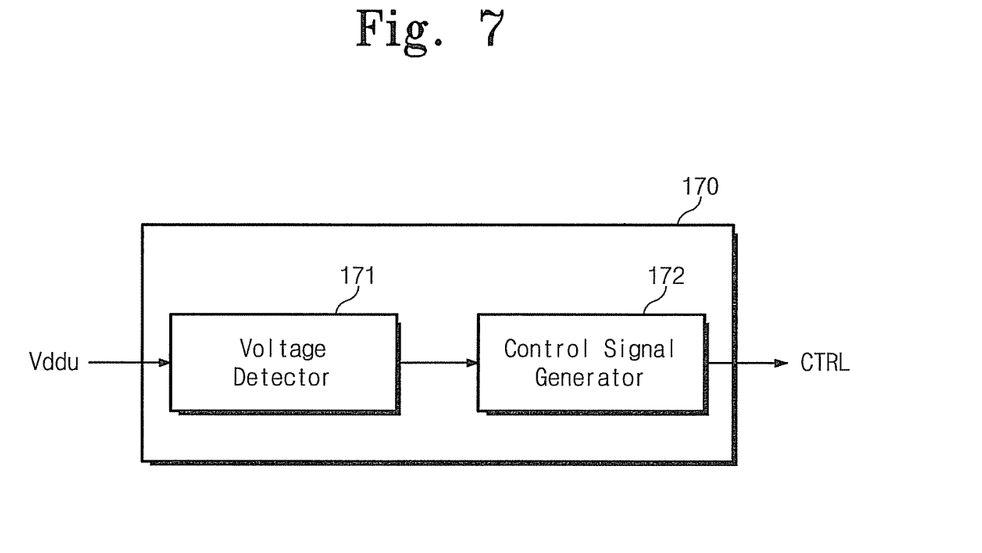
FIG. 7 illustrates a structure of a control circuit shown in FIG. 5 or 6.

FIG. 7 shows a structure of the control circuit 170 shown in FIG. 5 or 6. As shown, the control circuit 170 may include a voltage detector 171 and a control signal generator 172.

The control circuit 170 described in FIG. 5 performs an operation as follows.

The control circuit 170 generates a control signal to cause the whole resistance value Req of the voltage/current converter 130-2 to increase when the size of a voltage signal Vddu is less than that of a reference voltage signal. That is, the control circuit 170 generates a control signal CTRL to increase the resistance value Rx3 of the variable resistance VR.

Conversely, the control circuit 170 generates a control signal CTRL maintained at the resistance value Req of the current/voltage converter 130-2 when the size of the voltage signal Vddu is equal to that of the reference voltage signal.

The control circuit 170 described in FIG. 6 performs an operation as follows.

The control circuit 170 generates a control signal CTRL to decrease a resistance value Req of the current/voltage converter 130-3 when the size of the voltage signal Vddu exceeds that of a reference voltage signal. That is, the control circuit 170 generates a control signal CTRL controlling the second NMOS transistor N2 (see FIG. 5 or 6) to perform a turn-on (switching-on) operation.

The control circuit 170 generates a control signal CTRL to increase the resistance value Req of the current/voltage converter 130-3 when the amplitude of the voltage signal Vddu is less than the amplitude of the reference voltage signal. That is, the control circuit 170 generates a control signal CTRL controlling the NMOS transistor N2 to perform a turn-off (switching-off) operation.

The control circuit 170 generates a control signal CTRL to be maintained at the resistance value Req of the current/voltage converter 130-2 when the size of the voltage signal Vddu is equal to that of the reference voltage signal.

The current/voltage converter 130 according to inventive concepts generates a voltage signal by using the characteristic of Vcon=Ir*Req. Therefore, the resistance value Req may decrease when the size of the current signal Ir increases. The resistance value Req may increase when the size of the current signal Ir decreases. Through the above relationship between the current signal Ir and the resistance value Req, the current/voltage converter 130 (as an example, 130-1, 130-2 or 130-3) may generate a voltage Vcon to be included within a operation range of the buffer 50.

The RFID tag 200 proposed in inventive concepts may prevent or reduce the deterioration of signal reception performance caused by an obstacle or a spaced distance. As the signal reception performance is improved, the RFID system may tolerate an increased spaced distance between an RFID reader and an RFID tag.

As described so far, an RFID tag performs a signal reception operation in consideration of the amplitude of a received signal from an RFID reader to prevent signal reception performance from being deteriorated by variations in the amplitude of the received signal.

While inventive concepts has been described with reference to example embodiments, it will be apparent to those skilled in the art that various changes and modifications may be made without departing from the spirit and scope of inventive concepts. Therefore, it should be understood that example embodiments are not limiting, but illustrative. Thus, the scope of inventive concepts is to be determined by the broadest permissible interpretation of the following claims and their equivalents, and shall not be restricted or limited by the foregoing description.

Although example embodiments have been particularly shown and described in this specification and figures, it would be appreciated by one of ordinary skill in the art that variations in form and detail may be made therein without departing from the spirit and scope of the claims.

What is claimed is:

1. A radio frequency identification (RFID) device comprising:
   a voltage generator configured to generate a voltage signal from a reception signal;
   a common gate circuit configured to convert the voltage signal into a current signal;
   a current/voltage converter configured to convert the current signal into a converted voltage signal by controlling a resistance value; and
   a buffer configured to buffer a low-pass-filtered version of the converted voltage signal to generate a buffered signal, the low-pass filtered version of the converted voltage signal being within an operation range of the buffer;
   wherein the current/voltage converter controls the resistance value to convert the current signal into the converted voltage signal.

2. The RFID device as set forth in claim 1, wherein the current/voltage converter comprises:
   a transistor operating in response to the current signal, the transistor including a source and a gate connected to each other and a drain connected to a ground terminal; and
   a resistor connected in parallel to the transistor.

3. The RFID device as set forth in claim 2, wherein the transistor controls the resistance value to decrease through a turn-on operation when an amplitude of the current signal is greater than an amplitude of a reference current signal and controls the resistance value to be maintained through a turn-off operation when the amplitude of the current signal is less than the amplitude of the reference current signal.

4. The RFID device as set forth in claim 1, further comprising:
a control circuit configured to generate a control signal for controlling the resistance value based on the amplitude of a voltage signal obtained from the reception signal.

5. The RFID device set forth in claim 4, wherein the current/voltage converter comprises:
a variable resistor having a resistance value varying in response to the control signal; and
a resistor connected in series to the variable resistor and connected to a ground terminal.

6. The RFID device set forth in claim 5, wherein:
the control circuit generates the control signal controlling the resistance value to decrease through control of the variable resistor when the amplitude of the voltage signal is greater than an amplitude of a reference voltage signal; and
the control circuit generates the control signal controlling the resistance value to increase through the control of the variable resistor when the amplitude of the voltage signal is smaller than the amplitude of the reference voltage signal.

7. The RFID device set forth in claim 4, wherein the current/voltage converter comprises:
a transistor configured to perform a switching operation in response to the control signal; and
a resistor connected in series to the transistor and connected to a ground terminal.

8. The RFID device set forth in claim 7, wherein the control signal controls the resistance value to decrease through a turn-on operation of the transistor when the amplitude of the voltage signal is greater than the amplitude of a reference voltage signal and the control signal controls the resistance value to increase through a turn-off operation of the transistor when the amplitude of the voltage signal is smaller than the amplitude of the reference voltage signal.

9. The RFID device of claim 1, further comprising:
a low-pass filter configured to perform low-pass filtering on the converted voltage signal to generate the low-pass filtered version of the converted voltage signal; and
a peak detector configured to detect a peak value from the buffered signal to demodulate information data of the reception signal.

10. A method for receiving a signal of a radio frequency identification (RFID) device, comprising:
generating a voltage signal from a reception signal;
converting the voltage signal into a current signal;
converting the current signal into a converted voltage signal by controlling a resistance value;
performing low-pass filtering on the converted voltage signal;
buffering the low-pass filtered converted voltage signal to be within an operation range of a buffer; and
detecting a peak value of the buffered signal to demodulate information data of the reception signal,
wherein converting the current signal into the converted voltage signal comprises
controlling the resistance value to decrease when the amplitude of the current signal is greater than the amplitude of a reference current signal, and
converting the current signal into the converted voltage signal by controlling the resistance value to increase when the amplitude of the current signal is smaller than the amplitude of the reference current signal.

11. A current/voltage converter configured to generate a voltage signal with a constant amplitude comprising:
a resistance element configured to receive a current signal, wherein the resistance element includes:
a variable resistance component; and
a constant resistance component coupled to the variable resistance component;
wherein the voltage signal is a voltage drop across the resistance element,
wherein the variable resistance component is a transistor,
wherein the transistor is coupled in parallel with the constant resistance component,
wherein the transistor is configured to receive the current signal at the source of the transistor,
wherein the transistor controls the transistor resistance value by adjusting the transistor resistance value down through a turn-on function when the amplitude of the current signal is greater than the amplitude of a reference current signal, and
wherein the transistor controls the transistor resistance value by adjusting the transistor resistance value up through a turn-off function when the amplitude of the current signal is smaller than the amplitude of the reference current signal.

* * * * *